United States Patent
Converse et al.

(10) Patent No.: US 7,087,329 B2
(45) Date of Patent: Aug. 8, 2006

(54) ELECTRIC STORAGE AUGMENTATION OF FUEL CELL SYSTEM TRANSIENT RESPONSE

(75) Inventors: David G. Converse, Hampden, MA (US); Steven J. Fredette, South Windsor, CT (US)

(73) Assignee: UTC Fuel Cells, LLC, South Windsor, CT (US)

(*) Notice: Subject to any disclaimer, the term of this patent is extended or adjusted under 35 U.S.C. 154(b) by 8 days.

(21) Appl. No.: 10/717,089

(22) Filed: Nov. 19, 2003

(65) Prior Publication Data
US 2005/0106432 A1    May 19, 2005

(51) Int. Cl.
*H01M 8/04*    (2006.01)
*H01M 10/44*    (2006.01)
*H02J 7/02*    (2006.01)

(52) U.S. Cl. .................... 429/13; 320/101; 307/46
(58) Field of Classification Search .................. 429/12, 429/13; 320/101; 307/46, 66
See application file for complete search history.

(56) References Cited

U.S. PATENT DOCUMENTS

| | | | |
|---|---|---|---|
| 5,777,454 A * | 7/1998 | McAndrews et al. | 307/66 |
| 6,484,830 B1 * | 11/2002 | Gruenwald et al. | 180/65.2 |
| 6,737,762 B1 * | 5/2004 | Koenig | 307/48 |
| 6,794,844 B1 * | 9/2004 | Hochgraf et al. | 320/101 |
| 6,847,127 B1 * | 1/2005 | Lee | 290/40 C |
| 6,864,003 B1 * | 3/2005 | Ueda et al. | 429/25 |
| 2004/0018399 A1 * | 1/2004 | Jung | 429/9 |

FOREIGN PATENT DOCUMENTS

| | | | |
|---|---|---|---|
| JP | 2002324562 A | * | 11/2002 |
| JP | 2003304606 A | * | 10/2003 |
| KR | 2003050139 A | * | 6/2003 |

* cited by examiner

*Primary Examiner*—Gregg Cantelmo
(74) *Attorney, Agent, or Firm*—M. P. Williams

(57) ABSTRACT

A fuel cell stack (7) with output lines (8, 9) has a bank of supercapacitors (10) or batteries (10a) connected across the output lines, either directly or through a DC/DC converter (22). The fuel cell stack receives fuel either from a reformer (13) or a source (13a) of hydrogen. Power is supplied through a power conditioning system (15) to a load (16), all under the control of a controller (19). The supercapacitors or batteries receive additional charge from excess power when there is a sudden decrease in the load, and provide charge to the output power lines (8, 9) when there is a sudden increase in load demand. In one embodiment, the voltage of the supercapacitors or batteries always follow the voltage of the fuel cell stack, thereby providing or receiving commensurate charge. With the DC/DC converter, the supercapacitors or batteries may be operated at voltages which are a multiple or a fraction of fuel cell stack voltage, and may have voltages boosted or bucked to aid in response to transients.

1 Claim, 2 Drawing Sheets

ELECTRIC STORAGE AUGMENTATION OF FUEL CELL SYSTEM TRANSIENT RESPONSE

TECHNICAL FIELD

This invention relates to a fuel cell power plant having batteries or a bank of super capacitors connected electrically in parallel with the fuel cell stack, thereby to provide energy for increased load transients and to absorb energy during decrease load transients.

BACKGROUND ART

When a fuel cell stack assembly is operating normally and there is a sudden increase in the load, the capability of the fuel cell stack assembly to provide the required current is primarily a function of the amount of fuel resident in the fuel flow fields. If the fuel flow fields are designed so as to have a larger volume of fuel adjacent to the fuel cell membrane, the fuel cell stack assembly will have a greater increasing-load transient response capability. However, providing increased fuel volume in the fuel flow fields requires that the fuel channels be larger at the expense of thinner inter-channel ribs, which will decrease the strength of the fuel cell stack, and can lead to cracking of the fuel cells during assembly and other handling. On the other hand, providing a larger volume for each fuel cell would usually be prohibitive in automotive applications, such as where a fuel cell power plant provides the electricity for an electric vehicle.

In order to achieve maximum fuel utilization, on the order of 90% or more, fuel recycle may be employed. In such a case, there is essentially no excess hydrogen resident in the fuel flow fields. Thus, the use of fuel recycle to boost system efficiency comes at the expense of a reduction in increased-load transient capability.

A fuel cell power plant operating normally may undergo a sudden decrease in load. The fuel processing system, including valves and solenoids, lags in its response to this reduction in demand, so that a large amount of excess hydrogen is not consumed in the fuel cell stack. The excess hydrogen may pass into a downstream burner of some sort; the amount of hydrogen fed to the burner under a reduced-load transient may be several times the amount of hydrogen that the burner would normally have to handle. In order to be able to consume the excess hydrogen, without causing equipment damage, the volume and burning capacity must be increased, which increases the overall volume and cost of the fuel cell power plant. If excess hydrogen is simply exhausted, it must be done so in a safe manner, such as by diluting the hydrogen to less than one percent; this may require increased ventilation capabilities in the entire fuel processing system. Tighter controls on the fuel control response rate may mitigate the problem of excess hydrogen, but it would never eliminate the problem entirely, and may add significant cost to a fuel cell system.

The problem of excess fuel resulting from a sudden decrease in load is referred to in U.S. Pat. No. 6,572,993. However, the system therein operates a storage device, such as a battery pack, a plurality of capacitors or a plurality of supercapacitors, at a nearly uniform level which is a predetermined percentage of the maximum charge level, such as 80%. In response to a sudden reduced load, the energy storage device absorbs excess energy generated by the fuel cell until the amount of fuel entering the anode is lowered to a level not to require the energy storage device to be necessary. At that time, the energy storage device dissipates the excess energy back to its original predetermined level. When the load returns to its previous, normal level, the energy storage device provides excess energy to maintain a desired power output level. As more fuel is provided to the anode, the storage level of the electric power and the energy storage device can be returned to its normal level.

The foregoing patent, therefore, has a system in which steady state conditions are paramount, and transient dips in the load are accommodated by the manner in which the energy storage device is controlled to absorb excess energy, and to thereafter dissipate it, and at the end of the transient provides excess energy and is thereafter returned to its original predetermined level.

If capacitors or supercapacitors are used as the electric storage device, since charge is equal to the voltage times the capacitance, and the charge is always set to a specific fraction, such as 80% of maximum charge, the system of said patent is always set to a fixed, certain, specific predetermined voltage, regardless of anything else. If batteries are used, the voltage will be constant, at any given level of charge.

The aforementioned system will not satisfy the requirements of most modern applications of a fuel cell power plant upon which the demand varies continuously and significantly, such as a fuel cell power plant providing the power to an electric vehicle.

DISCLOSURE OF INVENTION

Objects of the invention include: a fuel cell power plant which can readily handle abrupt increases and decreases in load; increased capability of the fuel cell stack to handle abrupt decreases in load, without weakening the fuel cell structure; provision of reformers for converting hydrocarbon fuel to hydrogen for use as a fuel cell fuel which may utilize slowly responding sensors and valves; cost effective production and utilization of hydrogen in a fuel cell stack; and an improved apparatus for converting hydrocarbon fuel to electricity by means of a reformer and a fuel cell stack.

The invention is predicated on the realization that adjustments, not only in the amount of hydrogen required but also the power conditioning required to serve a widely varying load need not be made instantly, but may instead be instantly accommodated electrically, at the fuel cell output, provided suitable apparatus and operating methodology are employed.

According to the present invention, the electrical output of a fuel cell power plant is controlled, either through actively controlled switching, with voltage conversion, or directly and passively, by an electrical storage bank, such as a bank of supercapacitors or batteries. The bank of supercapacitors or batteries is connected between the fuel cell stack and the output power conditioning system that feeds the load.

In accordance with the invention in one form, an electrical storage bank is directly connected across the electrical output of a fuel cell stack, the voltage of the electrical storage device being allowed to follow completely, at all times, the voltage output of the fuel cell stack, without any intervening controls. The electric storage device thereby automatically provides or receives charge as necessary in order to maintain the voltage of the electric storage device substantially identical to the voltage of the fuel cell stack, with only a very slight lag, which is inconsequential.

According to the invention in another form, the voltage of an electric storage device, such as a bank of supercapacitors or batteries, is isolated from the voltage of a fuel cell stack by means of a regenerative DC/DC converter.

By handling shortages and excesses of electricity on the electrical side of the fuel cell stack, the production and/or application of hydrogen to the fuel cell stack can be regulated in a fashion which is much slower than the electrical load transients, without increased cost, endangering apparatus, or polluting the atmosphere, and the power conversion apparatus feeding a grid or other load can operate in a small range, with fewer constraints, and with more efficiency at lower cost.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
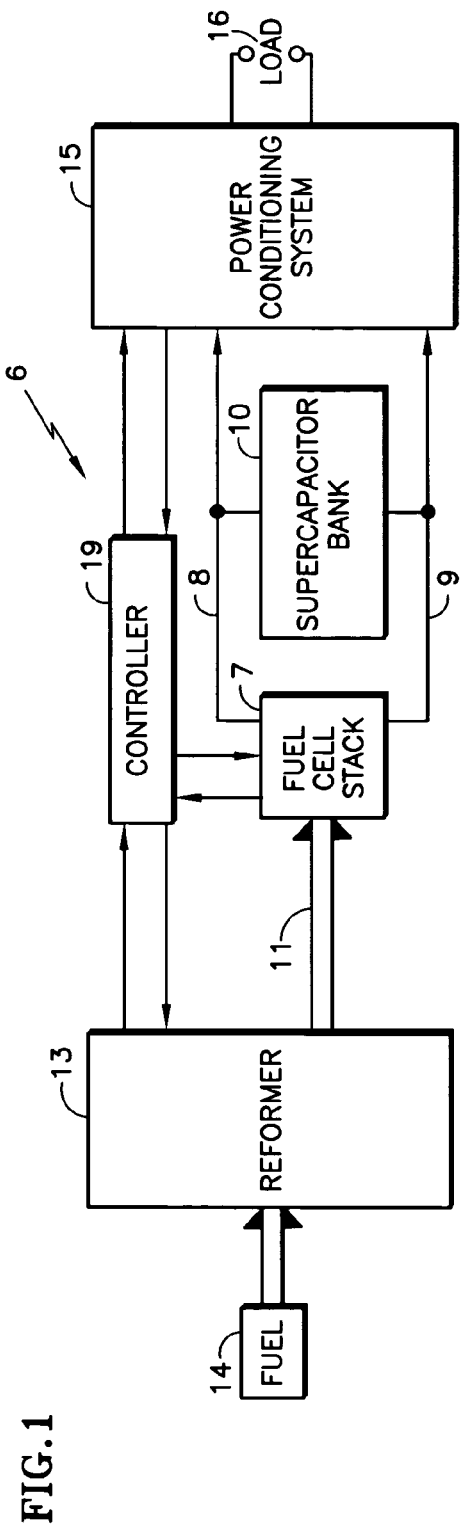
FIG. 1 is a simplified block diagram of a fuel cell power plant receiving fuel converted from hydrocarbon fuels by a reformer.

Referring to FIG. 1, a fuel cell power plant 6 includes a fuel cell stack 7 having electric output lines 8, 9 with an energy storage device, such as a supercapacitor bank 10, connected directly in parallel with the fuel cell stack 7 between the output lines 8, 9, in accordance with the invention. In the embodiment herein, the fuel cell stack 7 receives hydrogen-containing fuel in a conduit 11 from a reformer 13 that converts hydrocarbon fuel from a source 14, which may, for example, be a catalytic partial oxidizer reformer system such as those disclosed in copending U.S. patent application Ser. No. 10/369,359, filed Feb. 18, 2003 now abandoned, or any other reformer suitable to provide innocuous hydrogen-rich fuel to a fuel cell stack.

The power on the output lines 8, 9 is controlled for its intended use by a conventional power conditioning system 15, which applies the power to a load 16 which may be a grid, an electric vehicle motor, or any other load. As used herein, the term "load" may mean the load 16, or it may mean the power conditioning system 15 and the load 16. With a supercapacitor bank 10 in parallel with the fuel cell stack 7, when the load 16 decreases, the controller 19 will cause less fuel to enter the fuel supply 14. There is, however, a surplus of hydrogen in the fuel cell stack and fuel supply system. As the load 16 decreases, the voltage on power output lines 8 and 9 increases. This causes the voltage in the supercapacitors to increase and they increase in charge. The increase in charge to the supercapacitors consumes the excess power from the surplus hydrogen, which mitigates the duty on the fuel cell stack exhaust system ventilation or burner (not shown).

When the load 16 increases, the controller 19 will cause more fuel to enter the fuel cell stack by opening the fuel inlet valve in a conventional fashion, and will cause more hydrocarbon fuel to enter the reformer by opening the inlet valve thereof, along with other adjustments. However, before the amount of fuel can be ramped up to the required new level, the fuel cell stack will not be performing adequately to handle the load. With increased current level provided by the fuel cell stack, the average cell voltage will drop, dropping the voltage of the supercapacitor bank 10, causing charge to flow out of the supercapacitor bank, thereby supplying current to the power conditioning system 15. Thus, the supercapacitor bank 10 is passively controlled, automatically, by being connected directly in parallel with the electric output of the fuel cell stack 7. With the invention, current flows from the supercapacitor bank 10 into the power conditioning system 15 to satisfy the power needs of the load 16 in response only to the voltage of the fuel cell stack electric output on lines 8, 9.

The controller 19 will eventually ramp up the amount of hydrogen produced by the reformer 13 and the amount of hydrogen-rich fuel admitted from the conduit 11 into the anodes of the fuel cell stack 7. As that happens, the supercapacitor bank 10, in accordance with the invention, will simply continue to track the voltage of the fuel cell stack output on the lines 8, 9, thereby being continuously able to respond to any variations in the load, at any stage of transients or restoration of fuel equity with respect to load. In the embodiment of FIG. 1, this is done passively, simply because of the direct parallel connection of the supercapacitor bank between the output lines 8, 9 of the fuel cell stack 7, without any intervening controls. Thus, in this embodiment of the invention, there is no need for any controls to restore a charge level of the supercapacitor bank in any fashion whatsoever, it being done automatically and passively.

In the embodiment of FIG. 1, the supercapacitor bank 10 is passive, that is, it simply receives or delivers electric charge in dependence on the voltage on the lines 8, 9 being greater or lesser than the voltage in the supercapacitor bank. Because the supercapacitor bank follows the voltage of the fuel cell stack at all times, it will always, except during actual transients, be at the voltage of the fuel cell stack, and therefore be ready to respond to either a higher voltage by receiving charge or a lower voltage by delivering charge.

Figure 2:
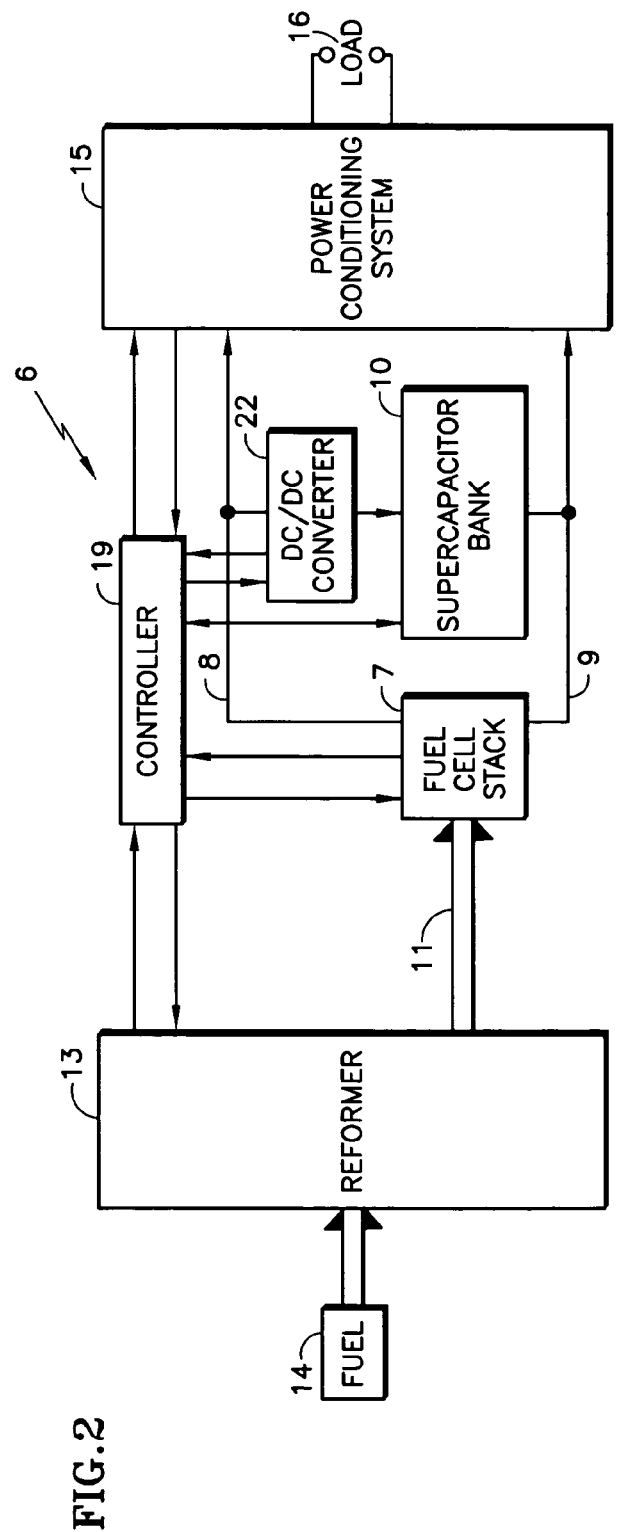
FIG. 2 is a simplified schematic block diagram of a variant of the system illustrated in FIG. 1 which includes a DC/DC converter.

If desired to suit any given implementation of the present invention, the supercapacitor bank charge and discharge functions can be augmented with a conventional regenerative DC/DC converter 22, shown in FIG. 2. The DC/DC converter will be most advantageous in circumstances where the transients may be extremely rapid and large, so that the voltage of the supercapacitor bank may not be high enough to drive the increase in load, and in similar situations where the voltage transitions to much lower voltages will be so great that the supercapacitor bank will not accept the charge unless it is raised to a higher voltage. Use of the converter 22 allows for a greater removal of energy (i.e., a deeper discharge).

In the embodiment of FIG. 2, by utilizing the DC/DC converter 22, the supercapacitor bank 10 may operate at voltages which are, for instance, substantially different from the voltage of the fuel cell stack on the lines 8, 9. As an example, the supercapacitor bank 10 may be operated in a range of voltages that approach several hundred volts, while the fuel cell stack may operate at voltages ranging from around 250 volts dc to around 450 volts dc, in a normal operation. In the embodiment of FIG. 2, the DC/DC converter can not only convert the voltage to some multiple or fraction of the fuel cell stack voltage, but can also buck and boost the voltage by responding to extremely sharp transients, such as by causing the controller to reduce the voltage on the side of the converter next to the supercapacitor bank by more than some multiple of a voltage reduction across the fuel cell stack lines 8, 9 in order to force more charge (more augmenting current) out of the supercapacitor bank.

The voltage at the electric storage device side of the DC/DC converter 22 will typically be a fraction of the fuel cell stack voltage. The controller 19 may control the DC/DC converter in response either to the voltage related to the load, such as between the lines 8, 9, a voltage at the load 16, or a substack voltage (e.g., of a group of cells) within the stack 7.

Figure 3:
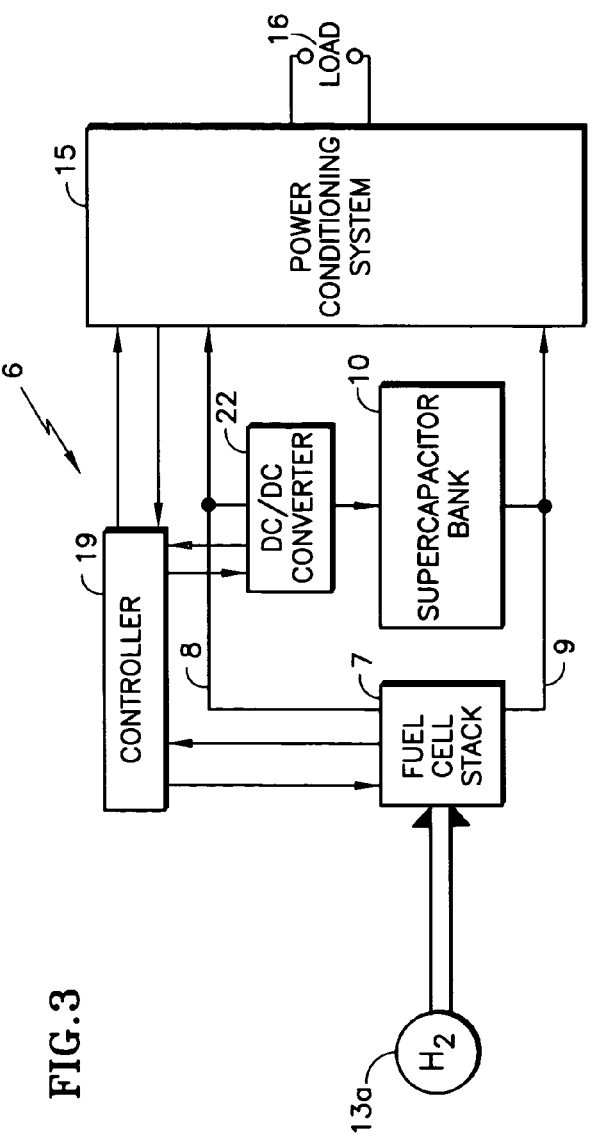
FIG. 3 is a simplified schematic diagram of a variation of the configuration of FIG. 2, in which fuel for the fuel cell stack is derived from a source of hydrogen, such as a tank of hydrogen.

FIG. 3 also illustrates that the source of hydrogen, instead of being derived from a reformer 13, may be a hydrogen tank 13a.

In the embodiments herein, a conventional power conditioning system 15 receives the power over the output lines 8, 9 from the fuel cell stack 7 and provides power to the load 16. In some systems, where a power conditioning system is not necessary, the invention may be utilized to drive the load 16 directly.

Figure 4:
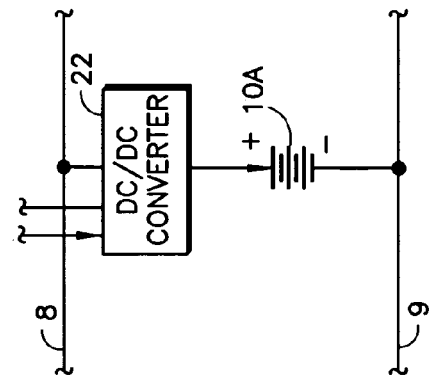
FIG. 4 is a partial, simplified schematic diagram of the apparatus of FIG. 2, illustrating that the energy storage device may be a battery.

FIG. 4 illustrates that the electric energy storage device may comprise a bank of batteries 10A.

The aforementioned patent and patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A method of operating a fuel cell power plant having a fuel cell stack with electric output power lines providing power to a load and an electric energy storage device associated with said fuel cell stack, said method comprising:

providing a voltage to said electric energy storage device which is always either (a) substantially a multiple or (b) substantially a fraction of the voltage between said electric output power lines; and controlling the voltage provided to said electric energy storage device in response to a voltage related to said load by (c) increasing or (d) decreasing said voltage provided to said electric storage device above or below said multiple or said fraction to increase response of said electric storage device to load transients.

* * * * *